Patented June 17, 1947

2,422,528

UNITED STATES PATENT OFFICE 2,422,528

TETRACHLOR SUCCINONITRILE AND PROCESS OF PRODUCING IT

Oliver W. Cass and Harry B. Copelin, Niagara Falls, N. Y., assignors to E. I. du Pont de Nemours & Company, Wilmington, Del., a corporation of Delaware No Drawing. Application October 21, 1944, Serial No. 559,834

14 Claims. (Cl. 260—464)

This application relates to a new chlorinated compound, tetrachlorosuccinonitrile, and to a novel process for the production thereof.

One of the objects of this invention is to provide a novel and useful chlorinated compound, in particular tetrachlorosuccinonitrile. Another object is to provide a novel process for the production of tetrachlorosuccinonitrile which is practical, efficient, and suitable for large-scale operation. These and other objects will be apparent from the ensuing description of the invention.

The above objects are attained in accordance with our invention by reacting succinonitrile with chlorine in the vapor phase.

We have discovered that conventional liquid-phase methods for the chlorination of organic compounds do not result in the obtainment of tetrachlorosuccinonitrile. As described in the copending application of Oliver W. Cass, Serial No. 559,833, filed October 21, 1944, liquid-phase chlorination of succinonitrile results in the production of entirely different compounds which are chlorine derivatives of maleonitrile and fumaronitrile, specifically monochloro and dichloro maleonitrile and fumaronitrile.

On the other hand, we have now discovered that, for example, when a mixture of succinonitrile vapor and chlorine is passed through a heated reaction zone at temperatures of 350° to 500° C., tetrachlorosuccinonitrile is obtained.

In one mode of carrying out our invention, a mixture of succinonitrile vapor and chlorine is heated in contact with a surface-active material. We have discovered that when the mixture of vapors is heated in contact with a surface-active material, good yields of tetrachlorosuccinonitrile are obtained at temperatures of 200 to 300° C., and when operating this embodiment of our novel process, we prefer to carry out the reaction by heating a mixture of succinonitrile vapor and chlorine in contact with a surface-active material, for example, activated carbon, at 200° to 300° C.

In one mode of carrying out our invention, a cylindrical reaction vessel is packed with a surface-active material. For example, activated carbon in granular form is packed into a glass tube equipped with suitable inlet means for the mixture of vapors and an outlet connected to a suitable condenser. The mass of activated carbon is heated to and maintained at a temperature within the range 200° to 300° C., and a mixture of succinonitrile vapor and chlorine in excess of the amount theoretically required is continuously introduced at the inlet end of the tube. The vapors of the reaction products pass out the exit end of the tube into the condenser, where excess chlorine and hydrogen chloride are removed. The condensate, which contains tetrachlorosuccinonitrile along with lower chloro derivatives containing four carbon atoms and decomposition products such as carbon tetrachloride may be purified by fractional distillation, recrystallization, or a combination of these methods.

When our process is operated to utilize a surface-active material, we prefer to maintain the reaction temperature at not less than 200° C., as at lower temperatures the reaction may be slow and incomplete, and difficulties may be encountered with condensation of succinonitrile within the reaction zone with consequent plugging of the reactor and undesirable channeling of the reacting vapors. Temperatures above 300° C. may be used, although we have found that higher temperatures are generally unnecessary and may result in decreased yield due to decomposition of the reaction products.

Likewise, for optimum results, we prefer to utilize temperatures of 350° to 500° C. when operating our novel process in the absence of a surface-active material, although temperatures somewhat above and below these preferred limits may be utilized if desired.

Although the above-described method of operating our invention, wherein a mixture of succinonitrile vapor and chlorine is heated in contact with a surface-active material or at higher temperatures in the absence of such materials, is satisfactory, we have further discovered that the production of tetrachlorosuccinonitrile may also be efficiently accomplished by first chlorinating succinonitrile in the liquid phase and then heating the chloronitriles thus obtained with chlorine in the vapor phase.

As disclosed and claimed in the copending application of Oliver W. Cass, Serial No. 559,833, filed October 21, 1944, monochloro and dichloro maleonitrile and fumaronitrile are produced by the reaction of chlorine with succinonitrile in the liquid phase. For example, chlorine is introduced into a body of molten succinonitrile contained in a suitable reaction vessel equipped with means for illuminating the reaction mixture with light from a 200-watt tungsten filament lamp. Initially the temperature is maintained at about 60° C. and is gradually increased during the reaction period until a maximum preferred temperature of about 150° C. is attained. When the reaction is complete, as evidenced by lack of further evolution of hydrogen chloride, the reaction mixture may be blown with air or nitrogen to remove traces of hydrogen chloride. Dependent upon whether the monochloro or dichloro derivatives of the unsaturated nitriles are desired, the amount of chlorine utilized in the liquid-phase chlorination is restricted to either two or three moles of chlorine per mole of succinonitrile.

When these unsaturated nitriles are to be used in the production of tetrachlorosuccinonitrile in accordance with the present invention, it is not essential that either of these chloronitriles be produced to the complete exclusion of the other. However, it is desirable to utilize sufficient chlorine to accomplish the production of preponderant amounts of the dichloro derivatives.

It has been observed that in the liquid-phase chlorination the reaction producing the dichloro nitriles becomes slow before a complete reaction has occurred, and it is preferred to stop the reaction before the reaction has slowed appreciably and utilize the mixed reaction products obtained thereby in the vapor-phase process of this invention. The lower chlorinated material may be separated and recycled if desired. However, this is not essential, and we may use the chlorinated mixture directly in the production of tetrachlorosuccinonitrile. Furthermore, if desired, any of the lower chlorinated products obtained in the liquid-phase chlorination stage may be isolated and utilized in the vapor-phase reaction to produce tetrachlorosuccinonitrile. Thus, in another embodiment of our invention a mixture comprising monochloro and dichloro maleonitrile and fumaronitrile and chlorine is heated in the vapor phase. The preferred conditions of operation are identical with those described for the utilization of succinonitrile and chlorine as reactants. The vapor-chlorine mixture may be heated in contact with a surface-active material or in the absence thereof to produce tetrachlorosuccinonitrile in good yield.

Regardless of the particular modification of our invention utilized, we have found it desirable to utilize an excess of chlorine over that theoretically required to form tetrachlorosuccinonitrile. Preferably an excess of 5 to 10 per cent chlorine is utilized.

The following examples illustrate our invention:

*Example I*

Succinonitrile, 80 parts, is vaporized into a stream of chlorine gas, the chlorine being present in substantial excess over that required to completely convert succinonitrile to tetrachlorosuccinonitrile, namely, 284 parts. The mixed vapors are passed through a reaction zone maintained at 350° C. by heating or cooling as is necessary. The gases from the hot reaction zone are cooled, and the liquid product separated and fractionally distilled. There is secured 100 parts of tetrachlorosuccinonitrile, boiling at 184° C., together with lower chlorinated derivatives, and products of side reactions such as carbon tetrachloride.

*Example II*

When the process of Example I is repeated, using in place of an empty heated reaction zone a reaction zone packed with active carbon, temperatures of only 200–250° C. are necessary to secure reaction. From 80 parts succinonitrile, 140 parts tetrachlorosuccinonitrile are secured, while the side reaction leading to the formation of carbon tetrachloride is substantially suppressed.

*Example III*

A mixture of monochloro and dichloro maleo and fumaronitriles, 627 g., was passed with excess chlorine through a 3 x 70 cm. tube packed with activated 8-mesh charcoal at 250–300° C. Four hours were required. Hydrogen chloride, 140 g., was recovered. The weight of crude product was 890 g. which, on distillation, yielded 412 g. tetrachlorosuccinonitrile, boiling at 180–186° C.

*Example IV*

A mixture of monochloro and dichloro maleo and fumaronitriles, 443 g., was passed with excess chlorine through a 3 x 70 cm. tube packed with activated 8-mesh charcoal at 250–300° C. Three hours were required, and the chlorine rate was so adjusted that 5 g. of chlorine per minute was metered in the offgas. Hydrogen chloride, 107 g., was recovered. The weight of crude product was 650 g., of which 350 g. was tetrachlorosuccinonitrile, boiling at 180–190° C.

When other known surface-active agents are utilized in place of activated carbon, satisfactory yields of tetrachlorosuccinonitrile are obtained. For example, Activated Alumina, silica gel, and other surface-active materials are suitable in practicing my novel process.

Tetrachlorosuccinonitrile, which may also be designated perchlorosuccinonitrile, the new compound of our invention is a useful compound which possesses unusual properties due to the combination of a high chlorine content with the absence of hydrogen in the molecule together with the presence of the stable and yet reactive nitrile group.

Tetrachlorosuccinonitrile is a white crystalline solid which melts at 130° C. An analysis of the compound for nitrogen and chlorine was made with the following results:

|  | Calculated | Found |
| --- | --- | --- |
|  | Per cent | Per cent |
| Nitrogen | 12.8 | 12.7 |
| Chlorine | 65.2 | 66.6 |

The novel product of our invention is useful as an intermediate in the production of various chemical compounds and may be utilized in the fields of insecticides and dielectrics.

We claim:

1. Process for the production of tetrachlorosuccinonitrile which comprises reacting succinonitrile with chlorine in the vapor phase.
2. Process for the production of tetrachlorosuccinonitrile which comprises reacting succinonitrile with chlorine in the vapor phase at temperatures of 200° to 550° C.
3. Process for the production of tetrachlorosuccinonitrile which comprises reacting succinonitrile with chlorine in the vapor phase at temperatures of 350° to 550° C.
4. Process for the production of tetrachlorosuccinonitrile which comprises reacting succinonitrile with chlorine in the vapor phase in contact with a surface-active material.
5. Process for the production of tetrachlorosuccinonitrile which comprises reacting succinonitrile with chlorine in the vapor phase in contact with a surface-active material at 200° to 300° C.
6. Process for the production of tetrachlorosuccinonitrile which comprises reacting succinonitrile with chlorine in the vapor phase in contact with activated carbon at 200° to 300° C.

7. Process for the production of tetrachlorosuccinonitrile which comprises reacting succinonitrile with chlorine in the liquid phase and then reacting the chlorinated products so obtained with chlorine in the vapor phase.

8. Process for the production of tetrachlorosuccinonitrile which comprises reacting succinonitrile with chlorine in the liquid phase to produce essentially a mixture of dichloromaleonitrile and dichlorofumaronitrile and reacting said mixture of dichloromaleonitrile and dichlorofumaronitrile with chlorine in the vapor phase.

9. Process for the production of tetrachlorosuccinonitrile which comprises reacting a compound selected from the group consisting of succinonitrile monochloromaleonitrile, dichloromaleonitrile, monochlorofumaronitrile and dichlorofumaronitrile with chlorine in the vapor phase.

10. Process for the production of tetrachlorosuccinonitrile which comprises reacting a compound selected from the group consisting of succinonitrile monochloromaleonitrile, dichloromaleonitrile, monochlorofumaronitrile and dichlorofumaronitrile with chlorine in the vapor phase at 350° to 550° C.

11. Process for the production of tetrachlorosuccinonitrile which comprises reacting a compound selected from the group consisting of succinonitrile, monochloromaleonitrile, dichloromaleonitrile, monochlorofumaronitrile and dichlorofumaronitrile, with chlorine in the vapor phase in contact with a surface-active material.

12. Process for the production of tetrachlorosuccinonitrile which comprises reacting a compound selected from the group consisting of succinonitrile, monochloromaleonitrile, dichloromaleonitrile, monochlorofumaronitrile and dichlorofumaronitrile with chlorine in the vapor phase in contact with a surface-active material at 200° to 300° C.

13. Process for the production of tetrachlorosuccinonitrile which comprises reacting a compound selected from the group consisting of succinonitrile monochloromaleonitrile, dichloromaleonitrile, monochlorofumaronitrile and dichlorofumaronitrile with chlorine in the vapor phase in contact with activated carbon at 200° to 300° C.

14. Tetrachlorosuccinonitrile.

OLIVER W. CASS.
HARRY B. COPELIN.

REFERENCES CITED

The following references are of record in the file of this patent:

UNITED STATES PATENTS

| Number | Name | Date |
| --- | --- | --- |
| 2,283,237 | Spence et al. | May 19, 1942 |

FOREIGN PATENTS

| Number | Country | Date |
| --- | --- | --- |
| 814,093 | France | June 14, 1937 |

OTHER REFERENCES

Doughty et al., Jour. Am. Chem. Soc., vol. 44, p. 638 (1922).

Ott et al., Ber. Deut. Chem., vol. 55B, p. 1255–1256 (1922).